Feb. 20, 1951 S. J. OLEJNICZAK 2,542,561
LEVEL COMPASS
Filed Sept. 15, 1947
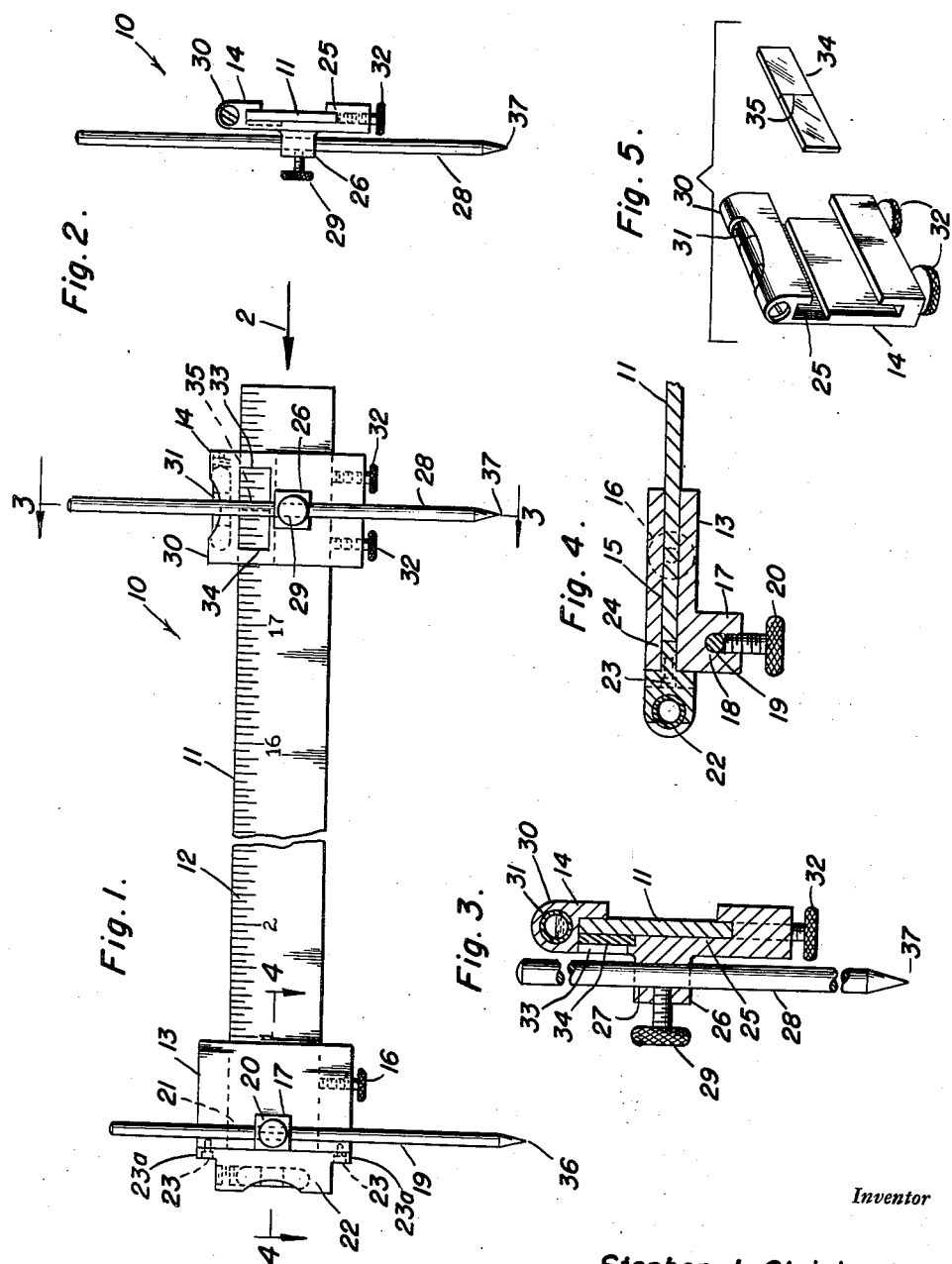
Inventor
Stephen J. Olejniczak
By Clarence A. O'Brien
and Harvey B. Jacobson
Attorneys Patented Feb. 20, 1951

2,542,561

UNITED STATES PATENT OFFICE 2,542,561

LEVEL COMPASS

Stephen J. Olejniczak, Detroit, Mich.

Application September 15, 1947, Serial No. 774,076

2 Claims. (Cl. 33—158)

This invention relates to new and useful improvements and structural refinements in geometrical instruments, more specifically, in compasses, dividers or the like, and the principal object of the invention is to provide a device of the character herein described which includes in its construction spirit levels for guiding proper positioning of the instrument while measurements are being taken and thereby substantially increasing the accuracy of measurement, notwithstanding the roughness or irregularity of the surface on which the measurement may be taken.

A further object of this invention is to provide a level compass which is simple in construction, which, if desired, may be employed in association with a conventional ruler, and which will not easily become damaged.

An additional object of the invention is to provide a level compass which will readily lend itself to economical manufacture and which is otherwise well adapted for the purpose for which the same is intended.

With the above more important objects in view, and such other objects as may become apparent as this specification proceeds, the invention consists essentially of the arrangement and construction of parts as illustrated in the accompanying drawings, in which:

Figure 1 is a side elevational view of the invention.

Figure 2 is an end view thereof taken in the direction of the arrow 2 in Figure 1.

Figure 3 is a cross-sectional view, taken substantially in the plane of the line 3—3 in Figure 1, Figure 4 is a cross-sectional view, taken substantially in the plane of the line 4—4 in Figure 1, and Figure 5 is a perspective view showing the construction of one of the blocks used in the invention.

Like characters of reference are employed to designate like parts in the specification and throughout the several views.

Referring now to the accompanying drawings in detail, the invention consists of a level compass designated generally by the reference character 10, the same embodying in its construction a graduated beam 11, including the scale 12, and provided at one end thereof with what may be referred to as a stationary block 13. A travelling block 14 is slidably positioned on the beam 11, the structure of the block 14 being hereinafter more fully described.

The aforementioned stationary block 13 is configurated substantially as shown, and is provided with a transverse slot 15 adapted to slidably receive the beam 11. The block 13 is clamped to the beam 11 by means of a set screw 16, and it will be observed that the block 15 is formed integrally with the protuberance 17, provided with a bore 18, adapted to slidably receive a finger 19 which is adjustably secured in the bore 18 by means of a further set screw 20.

Matters are so arranged that the longitudinal axis of the finger 19 is coincident or aligned with the "zero" line of the scale 12, the "zero" line being indicated for reference purposes by the reference character 21.

A suitable spirit level assembly 22 includes a pair of end ears 23a that are secured by the screw or screws 23 to the block 13, the housing of the level 22 including a projection 24 which is receivable in the slot or recess 15 formed in the block 13 and abuts against the end of the beam 11, as is best shown in Figure 4.

Inasmuch as the level 22 is rigidly secured to the block 13, the projection 24 will assure that the beam 11 is inserted to the proper depth or extent in the slot 15, thereby assuring accuracy of alignment of the "zero" line 21 with the longitudinal axis of the finger 19.

The aforementioned travelling block 14 is formed with a channel 25 adapted to slidably receive the beam 11, and is also provided with an integral protuberance 26, formed with a bore 27, adapted to slidably accommodate a further finger 28 which is adjustably secured in position by means of a set screw 29.

The block 14 is formed also with an integral housing 30 containing a further spirit level 31, and it should be noted at this point that while the longitudinal axis of the aforementioned level 22 is disposed in parallel to the end of the beam 11, the longitudinal axis of the level 31 is disposed in parallel to the longitudinal axis of the beam, as is best illustrated in Figure 1.

The block 14, as a whole, is adjustably secured to the beam 11 by means of a pair of set screws 32, and the block is also provided with an opening or window 33 in which a transparent panel 34 is mounted in any suitable manner. The panel 34 is, in turn, equipped with a hairline 35, matters being so arranged that this hairline is coincident or aligned with the longitudinal axis of the finger 28, as will be clearly apparent. By virtue of this arrangement, the accuracy of measurement will be assured, that is, with respect to the graduated scale 12 of the beam 11, since the longitudinal axis of the finger 19 coincides with the "zero" line of the scale, while the axis of the finger 28 may be made to correspond or coincide with an appropriate reading of the scale, by simply loosening the set screws 32 and sliding the block 14.

As will be clearly apparent, the essence of novelty in the invention resides in the association of these spirit levels 22, 31 with the respective blocks 13, 14, which levels having their longitudinal axes disposed in perpendicular relation, will facilitate the placing of a beam in a truly horizontal and vertical position, notwithstanding the unevenness or irregularity of the surface on which measurement is being taken. Needless to say, by simply loosening the set screws 20, 29, the fingers 19 and 28 may be adjusted with respect to their respective blocks 13, 14, so as to compensate for the irregularity of the surface of the work, while at the same time, facilitating the maintenance of proper level, as indicated by the levels 22 and 31.

While, for illustrative purposes, the fingers 19 and 28 are disclosed as having pointed extremities 36, 37 respectively, these fingers may, of course, be substituted by pencils or the like, so as to suit the prevalent working conditions.

It is believed that the advantages and use of the invention have been clearly explained in the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. In a level compass, a substantially rectangular block having a transverse opening extending therethrough, a spirit level having end ears secured to one side of the block, a rib on the level entering the opening and including a straight edge disposed longitudinally of the block, a ruler having one end mounted in the opening, said one end of said ruler having a straight transverse edge engaging the straight edge of said rib, a protuberance attached to and projecting laterally from the block intermediate the ends of the block and having an elongated bore, the axis of the bore lying in a vertical plane that encompasses the abutting surfaces of said straight edges, and a finger slidably and adjustably mounted in said bore and having a conical tip.

2. In a level compass, a substantially rectangular block having a transverse opening extending therethrough, a spirit level having end ears secured to one side of the block, a rib on the level entering the opening and including a straight edge disposed longitudinally of the block, a ruler having one end mounted in the opening, said one end of said ruler having a straight transverse edge engaging the straight edge of said rib, a protuberance attached to and projecting laterally from the block intermediate the ends of the block and having an elongated bore, the axis of the bore lying in a vertical plane that encompasses the abutting surfaces of said straight edges, a finger slidably and adjustably mounted in said bore and having a conical tip, and a scriber-holding means slidably and adjustably mounted on said ruler.

STEPHEN J. OLEJNICZAK.

REFERENCES CITED

The following references are of record in the file of this patent:

UNITED STATES PATENTS

| Number | Name | Date |
|---|---|---|
| 962,702 | Diracca | June 28, 1910 |
| 1,321,312 | Jooss | Nov. 11, 1919 |
| 1,619,750 | Nelson | Mar. 1, 1927 |
| 1,653,016 | Mellor | Dec. 20, 1927 |
| 2,363,166 | Vierling | Nov. 21, 1944 |
| 2,435,644 | Beckett et al. | Feb. 10, 1948 |

FOREIGN PATENTS

| Number | Country | Date |
|---|---|---|
| 290,500 | Germany | Mar. 4, 1916 |